Nov. 3, 1964 G. D. DOLCH, JR 3,154,849
METAL FORGING PROCESS
Filed Jan. 18, 1961 2 Sheets-Sheet 1

INVENTOR.
George D. Dolch, Jr.
BY
ATTORNEYS

Nov. 3, 1964 G. D. DOLCH, JR 3,154,849
METAL FORGING PROCESS
Filed Jan. 18, 1961 2 Sheets-Sheet 2
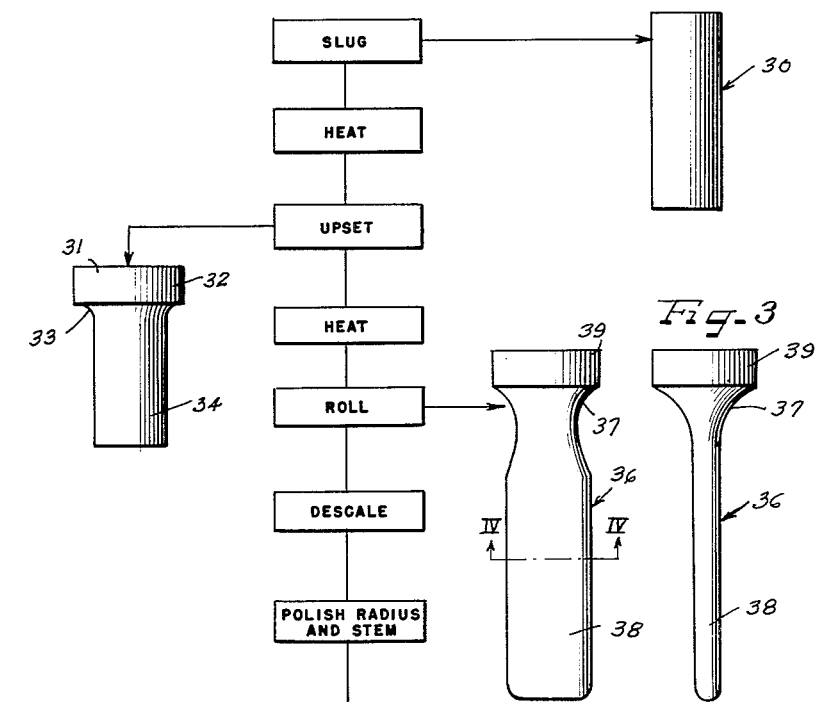
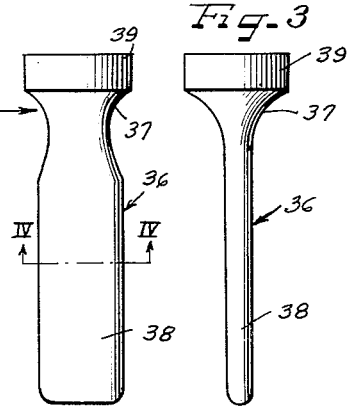
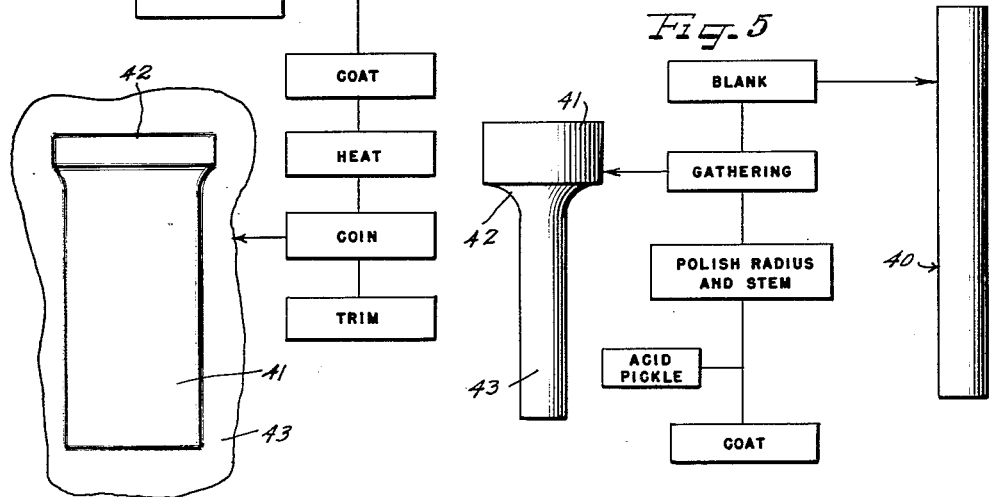
INVENTOR.
George D. Dolch, Jr.
BY
ATTORNEYS

United States Patent Office 3,154,849
Patented Nov. 3, 1964

3,154,849
METAL FORGING PROCESS
George D. Dolch, Jr., Euclid, Ohio, assignor to Thompson Ramo Wooldridge Inc., Cleveland, Ohio, a corporation of Ohio
Filed Jan. 18, 1961, Ser. No. 83,574
2 Claims. (Cl. 29—528)

The present invention is directed to a process for hot working metals and, more particularly, to a method for shaping a metal article having a relatively thin airfoil section.

The present invention is directly applicable to the manufacture of fluid directing members for jet engines. Components such as compressor blades, vanes and turbine blades present particularly difficult manufacturing problems because they must be composed of a heat resistant, corrosion resistant or refractory metal in order to withstand the severe conditions which they encounter in use and they must be provided with relatively complex airfoil shapes in order to possess the proper aerodynamic characteristics. While it is possible to secure the proper airfoil shape in jet engine blades by grinding and machining operations, these operations are expensive and time consuming. The most desirable manufacturing procedure therefore is one which eliminates as far as possible any machining operations and produces an accurately sized and contoured jet engine blade by a series of hot working operations.

Some success has been achieved in the fabrication of compressor blades for jet engines by hot working procedures alone. Even so, manufacturing procedures in the past have required a relatively large number of successive hot working steps in order to produce an acceptable compressor blade.

The present invention is directed to a process which is applicable not only to the manufacture of compressor blades and vanes but also to the more complex turbine blades. In basic outline, the method of the present invention as applied to compressor blades involves starting with a cylindrical slug of the metal or alloy from which the blade is to be fabricated, heating the slug to an appropriate hot working temperature, and then forming the slug into a shape which includes a relatively large diameter head portion, a stem portion of smaller cross-sectional area, and often a conical neck portion joining the head and stem portions. This shape, after suitable cleaning and polishing, is coated with a ceramic type lubricant especially designed for this use, and then heated to a coining temperature. Then, with a single coining operation, the shape is formed into a compressor blade whose dimensions and contour are acceptably close to the finished dimensions desired in the article. Thus, with the process of the present invention, the number of coining blows and blockdown operations required are reduced with a consequent saving in time and costs.

An object of the present invention is to provide an improved method for shaping metal articles having airfoil contours.

Another object of the invention is to provide an improved hot working operation for metals having relatively high hot working temperatures.

Still another object of the invention is to provide a method for shaping jet engine blades in a process which is less expensive and less time consuming than previously used processes for shaping these types of articles.

Still another object of the invention is to provide an improved process for shaping turbine blades at temperatures which could not previously be employed because of the inherent limitations of previously used metal working processes.

While the process of the present invention is applicable to the shaping of metals generally, it finds particular applicability to the shaping of corrosion resistant alloys, high temperature heat resistant alloys, and refractory metals such as titanium, and nickel based alloys, most of which have forging temperatures of 1800° F. or higher. Among such alloys are those known commercially as "Waspaloy," "Udimet 500" and "Udimet 700." Typical analyses for these alloys, particularly useful for turbine blades, are listed in the following table:

| Element | Waspaloy | Udimet 500 | Udimet 700 |
|---|---|---|---|
| Carbon | 0.10 max | 0.15 max | 0.15 max. |
| Aluminum | 1.0–1.5 | 2.5–3.25 | 3.75–4.75. |
| Titanium | 2.75–3.25 | 2.5–3.25 | 2.75–3.75. |
| Chromium | 18.0–21.0 | 15.0–20.0 | 13.0–17.0. |
| Cobalt | 12.0–15.0 | 13.0–20.0 | 14.0–20.0. |
| Molybdenum | 3.5–5.0 | 3.0–5.0 | 4.5–5.50. |
| Boron | 0.008 max | 0.010 max | 0.001–0.050. |
| Iron | 2.0 max | 4.0 max | 4.0 max. |
| Nickel | Bal | Bal | Bal. |

Alloys particularly suitable for the manufacture of compressor blades are given in the following table:

| Element | "403 Stainless" | "Greek Ascoloy" | A-286 |
|---|---|---|---|
| Carbon | 0.15 max | 0.15–0.20 | 0.08 max. |
| Manganese | 1.0 max | 0.50 max | 1.0–2.0. |
| Silicon | 1.0 max | 0.50 max | 0.40–1.0. |
| Sulfur | 0.030 max | 0.030 max | 0.030 max. |
| Phosphorus | 0.040 max | 0.040 max | 0.040 max. |
| Chromium | 11.5–13.5 | 12.0–14.0 | 13.5–16.0. |
| Nickel | 0.75 max | 1.8–2.2 | 24.0–27.0. |
| Molybdenum | 0.50 max | 0.50 max | 1.0–1.5. |
| Aluminum | 0.05 max | 0.15 max | 0.35 max. |
| Copper | 0.50 max | 0.50 max | |
| Tin | 0.05 max | 0.05 max | |
| Tungsten | | 2.50–3.50 | |
| Titanium | | | 1.9–2.3. |
| Boron | | | 0.0010–0.010. |
| Vanadium | | | 0.10–0.50. |
| Iron | Bal | Bal | Bal. |

A further description of the present invention will be made in conjunction with the attached sheets of drawings which represent flow charts for the processes involved.

FIGURE 2 is a flow chart of a process for making turbine rotor blades;

FIGURE 3 is a side elevational view of one of the shapes illustrated in FIGURE 2;

FIGURE 4 is a cross-sectional view of one of the shapes produced during the process of FIGURE 2; and FIGURE 5 is a flow chart of a modification of the process of FIGURE 2.

As shown on the drawings:

Figure 1:
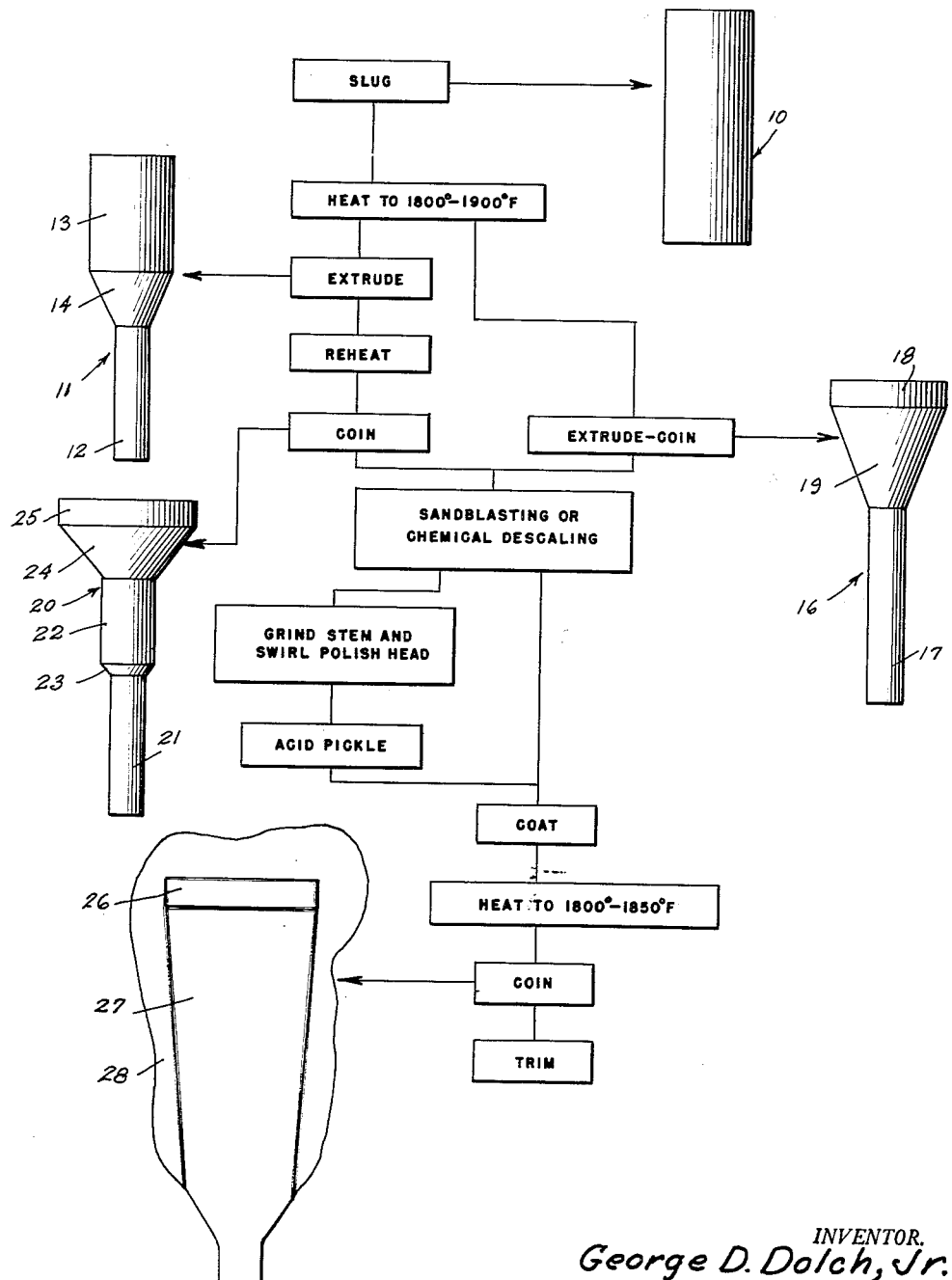
FIGURE 1 is a flow chart of a process for making compressor rotor blades.

In FIGURE 1, reference numeral 10 indicates a cylindrical slug of alloy which has a forging temperature of about 1800° F. The slug 10 is then heated to a temperature of 1800 to 1900° F. whereupon it is hot worked by either of two alternative methods. The first method, represented at the left-hand side of the flow chart involves extruding the slug into a shape referred to at numeral 11 of FIGURE 1. With some types of steel, it is possible to cast the metal into the shape indicated. The shape 11 includes a relatively small diameter cylindrical stem portion 12 and a relatively large diameter head portion 13 joined by means of a conical neck portion 14.

After extrusion, the shape is reheated to a temperature of 1800 to 1900° F. and then coined to produce a shape of the type illustrated generally at reference numeral 20 in the drawings. The shape 20 includes a relatively small diameter portion 21 and a cylindrical portion 22 of intermediate diameter joined by a conical neck 23. The cylindrical portion 22 terminates in a conical throat 24 which flares out to a relatively large diameter head portion 25.

If the article is relatively small, the slug after heating can be passed directly to a combined extruding and coining operation where the slug is formed into a shape 16 having a cylindrical stem portion 17, a larger diameter head portion 18 and a conical neck portion 19 joining the stem and head portions.

The shape produced is then cleaned by means of sandblasting or other mechanical descaling method, or a chemical descaling operation to remove any surface scale which may have resulted from the hot working operations. It is desirable to grind the stem of the shape and swirl polish the conical neck and head before proceeding further. An additional acid pickling may be desirable, followed by a visual inspection to determine any flaws remaining in the surface. These flaws can then be locally removed preparatory to the coining operation which follows.

The next step in the process consists in preparing the shape for the coining operation. Much of the success of the process depends upon the selection of the proper lubricant for the coining step. By applying a coating containing powdered ceramic material capable of fusing into a continuous protective film to the article, the resultant film effectively lubricates the shape during coining, and also protects it against attack by any gases present.

Forging temperatures up to 1900° and beyond, appropriate for low alloy steels used in compressor rotor blades, can be consistently maintained by the use of a ceramic lubricant having an analysis within the following range:

| | Percent by weight |
|---|---|
| $K_2O$ | 0.20–1.2 |
| $Na_2O$ | 2–5 |
| $Li_2O$ | 0.5–1.5 |
| PbO | 35–50 |
| $B_2O_3$ | 0.25–0.75 |
| $Al_2O_3$ | 1.5–5 |
| $SiO_2$ | 35–55 |
| $TiO_2$ | 2–5 |
| $ZrO_2$ | 0.1–1 |
| $Cr_2O_3$ | 0.0–4.0 |

A particularly preferred composition within the broader range described above is the following:

| | Percent by weight |
|---|---|
| $K_2O$ | 0.37–0.47 |
| $Na_2O$ | 2.82–3.32 |
| $Li_2O$ | 0.78–0.98 |
| PbO | 39.37–41.37 |
| $B_2O_3$ | 0.49–0.59 |
| $Al_2O_3$ | 1.82–2.12 |
| $SiO_2$ | 48.24–50.24 |
| $TiO_2$ | 2.93–3.43 |
| $ZrO_2$ | 0.28–0.38 |

Specific compositions which have been employed to achieve the improved results of the present invention are listed in the following table:

| | | |
|---|---|---|
| $K_2O$ | 0.84 | 0.42 |
| $Na_2O$ | 3.39 | 3.07 |
| $Li_2O$ | 0.95 | 0.88 |
| PbO | 44.60 | 40.37 |
| $B_2O_3$ | 0.58 | 0.54 |
| $Al_2O_3$ | 3.94 | 1.97 |
| $SiO_2$ | 41.89 | 49.24 |
| $TiO_2$ | 3.46 | 3.18 |
| $ZrO_2$ | 0.35 | 0.33 |

For the higher alloy materials used in the manufacture of turbine rotor blades, a ceramic composition having the following analysis has been found particularly effective:

| | Percent by weight |
|---|---|
| $K_2O$ | 2–5 |
| $Na_2O$ | 0.5–3.0 |
| CaO | 4.0–12.0 |
| PbO | 10–20 |
| $Al_2O_3$ | 5–15 |
| $B_2O_3$ | 3–10 |
| $SiO_2$ | 45–65 |

The ceramic material is most conveniently applied by suspending the frit in a volatilizable vehicle such as a lower molecular weight alcohol (1 to 5 carbon atoms) or an aromatic solvent such as benzene, toluene, or xylene. In order to achieve low temperature adhesion of the frit to the piece, the suspending medium is preferably a solution of a resinous binder in the volatilizable solvent. As the temperature is raised, the liquid vehicle is volatilized and the binder is burned off. It is highly desirable therefore to employ a binder which does not cause pock marks in the coating as a result of its thermal decomposition, and does not leave a carbonaceous residue. The acrylic resins are particularly suitable for this use because they have excellent adhesive properties and can be burned off cleanly. Very good results have been obtained with methacrylate resins having a molecular weight range referred to in the trade as "medium to high molecular weight."

Cellulose ethers such as carboxymethyl cellulose, hydroxy ethyl cellulose or methyl cellulose may also be used for this purpose as they burn off cleanly during heating of the coating, but the film strength of cellulose derivatives is not as great as the film strength of the preferred acrylic resins.

Still another suitable class of binders consists of the polymerized polyethylene glycols sold under the name "Carbowax."

The solids content of the coating composition is normally in the range from 30 to 60% by weight, with the balance being the vehicle. Of the solids content, the binder content will be on the order of 0.1% to about 10% by weight of the total solids. The remaining 90 to 99.9% of the solids consists of the inorganic materials making up the molten protective film during hot working.

The inorganic materials are employed as a partially vitrified or completely vitrified mass in particle sizes of about 300 mesh or lower, but larger particles may be employed where longer times are available for fusing the coating.

The coating can be applied either by dipping the articles into a slurry of the coating composition or by means of any suitable applicator such as a spray gun.

With this type of coating system, it is possible to apply a very uniform coating of the fusible particles onto the surface of the piece to be coined. There should be a sufficient deposit of the coating material on the article to provide a fused film having a thickness of about 0.001 to 0.007 inch prior to the coining operation.

After the shape is coated with the ceramic coating composition, it is heated to a coining temperature which may typically be in the range from 1800 to 1850° F. Then, the article is coined to transform the shape which previously had a circular cross section throughout into one of relatively flat configuration and including a relatively massive base portion 26 formed essentially from the enlarged head and neck portions of the shape, and a portion 27 having an arcuate airfoil contour and being formed from the metal in the stem portion of the shape. A peripheral flash 28 can be trimmed off subsequently to bring the piece to its final dimensions. After coining, the ceramic coating may be removed by sandblasting or by dissolution in alkali, or it may remain on the piece to serve as a protective coating during heat treating.

During coining, it is advisable to lubricate the faces of the dies with a graphitic die lubricant.

FIGURES 2 to 5 inclusive show processes which are particularly adapted for the manufacture of turbine blades. In FIGURE 2, reference numeral 30 indicates generally a slug or blank which is first heated to a temperature appropriate for upsetting one end of the slug to provide from the slug a shape 31 having a relatively large head portion 32, a neck portion 33 and a stem portion 34. Temperatures involved for upsetting will depend upon the metal used, an appropriate temperature for titanium alloys being in the range from 1700 to 1800° F., for the stainless steel mentioned previously, a temperature of about 1750 to 2000° F., while for other high temperature alloys, temperatures of 1800 to 2150° F. will be appropriate.

After the upsetting operation, the shape 31 is reheated to substantially the same range of temperatures, whereupon it is rolled to produce a shape 36 having an elliptical cross-section as seen in FIGURE 4. The rolling operation also serves to provide a rounded neck portion 37 between the stem portion 38 of the shape 36 and its head portion 39.

Any surface scale resulting from the rolling operation can then be removed by chemical or mechanical means. Next, the radius and stem of the shape 36 are polished as required, followed by an acid pickling, if necessary.

Then, the portions 37 and 38 of shape 36 are coated with the ceramic coating material of the type described previously and heated to an appropriate coining temperature, whereupon it is coined with a single blow to produce a turbine blade shape including an airfoil portion 41 and a relatively massive root portion 42 surrounded by a flash 43. Finally, the coined article is trimmed to remove the flash 43, to bring the piece to its final dimensions. After coining, the ceramic coating may be removed by suitable mechanical or chemical means.

The partial flow diagram illustrated in FIGURE 5 represents a modification of the initial steps for the process of FIGURE 2. In this form, the original blank 40 is a relatively long cylindrical blank. The blank 40 is then gathered by any known means such as by forge upsetting, or electrical gathering methods to produce an enlarged head portion 41, a neck portion 42 and a stem portion 43. After polishing of the radius and the stem, the shape may be acid pickled, if required. Then, the coating is carried out to provide the ceramic lubricant, and finally, the heating, coining, and trimming steps are carried out as illustrated in FIGURE 2.

Operation of the processes of the present invention has resulted in several distinct advantages. Lower forging pressures have been found usable. Where previously it was found necessary to employ coining pressures on the order of 300 tons per sq. in. and more, the present process operates satisfactorily in compressor blading alloys at coining pressures varying from about 20 to 100 tons per sq. in. Experience has also shown that less die breakage occurs with the new process and that improved blade surface quality is achieved. It is also possible, with the new process, to provide improved blade pitch thickness control. The cost has been reduced due to elimination of the blockdown operation. Furthermore, the process minimizes decarburization and intergranular oxidation.

The most significant advantage of the process is the fact that the jet engine blade can be reduced to finish size in one blow without excessive die wash which accompanies the similar reduction of uncoated extrusions or other preforms. Furthermore, the warm coining of a blockdown blade requires considerably higher pressures because of the larger surface area, and the cooling associated with thinner sections. By forging the arcuate cross-section in the closed dies, the metal is moved more readily to the desired form and size, and with lower pressures. For example, in forging a standard blade at a piece temperature of 1850° F., the press tonnage in coining the coated extrusion was 950 tons, while the press tonnage in restriking a blockdown blade at a coining temperature of 1600° F. was in the range from 1800 to 1900 tons. In this test run, a total of 360 blades forged by the new process were prepared, and only three were oversized in any of the designated gage sections in pitch thickness. In comparison, of 84 blockdown blades which were restruck in coining dies, four were oversize. This improvement in dimensional control is accompanied by an improvement in surface quality of blades produced by the present process.

It should be evident that various modifications can be made to the described embodiments without departing from the scope of the present invention.

This application is a continuation-in-part of my copending application entitled "Metal Forging Process," U.S. Serial No. 655,236, filed April 26, 1957, now abandoned.

I claim as my invention:

1. In a method of hot working a metal article in which said article is shaped at an elevated temperature, the steps of dipping said article into a slurry containing a resinous binder which is capable of being burned off without carbonization, said binder being selected from the group consisting of acrylic resins, cellulose ethers, and polymerized polyethylene glycols, a liquid solvent for said binder, and ceramic particles having an average particle size below about 300 mesh, said ceramic particles containing silica and lead oxide in at least partially vitrified form, and not working the resulting coated article at a temperature above the fusion range of said particles but below the melting point of the metal to thereby drive off said solvent, burn off said binder, fuse said ceramic particles, and provide a lubricating film on said article during said hot working.

2. In a method of hot working a titanium article in which said article is shaped at a temperature of at least 1800° F., the steps of spraying onto the surface of said article a coating composition comprising a resinous binder capable of being burned off without carbonizing, said binder being selected from the group consisting of acrylic resins, cellulose ethers, and polymerized polyethylene glycols, a liquid solvent for said binder, and ceramic particles having an average particle size below about 300 mesh and containing silica and lead oxide in at least partially vitrified form, and hot working the resulting coated article at a temperature above the fusion temperature of said ceramic particles to thereby drive off said solvent, burn off said binder, fuse said ceramic particles, and provide a lubricating film on said article during said hot working.

References Cited in the file of this patent

UNITED STATES PATENTS

| | | |
|---|---|---|
| 2,430,083 | Sherman | Nov. 4, 1947 |
| 2,538,917 | Sejournet et al. | Jan. 23, 1951 |
| 2,588,234 | Henricks | Mar. 4, 1952 |
| 2,743,509 | Friedman | May 1, 1956 |
| 2,756,493 | Hall | July 31, 1956 |
| 2,831,782 | Zvanut | Apr. 22, 1958 |
| 2,856,675 | Hansen | Oct. 21, 1958 |
| 2,957,232 | Bartlett | Oct. 25, 1960 |
| 2,987,806 | Pekarek | June 13, 1961 |